(12) United States Patent
Al-Wehebi

(10) Patent No.: US 7,310,047 B2
(45) Date of Patent: Dec. 18, 2007

(54) GAS ALARM SYSTEM WITH WIND DIRECTION INDICATOR

(75) Inventor: Fahad Al-Wehebi, Yanbu Industrial City (SA)

(73) Assignee: Saudi Arabian Oil Company, Dhahran (SA)

( * ) Notice: Subject to any disclaimer, the term of this patent is extended or adjusted under 35 U.S.C. 154(b) by 173 days.

(21) Appl. No.: 11/304,967

(22) Filed: Dec. 14, 2005

(65) Prior Publication Data

US 2007/0132601 A1   Jun. 14, 2007

(51) Int. Cl.
*G08B 17/10* (2006.01)
(52) U.S. Cl. .................. 340/632; 340/633; 340/539.26
(58) Field of Classification Search ................ 340/632, 340/633, 634, 539.1, 539.22, 539.26, 539.28; 73/170.07, 170.08, 170.09, 31.02, 40
See application file for complete search history.

(56) References Cited

U.S. PATENT DOCUMENTS

| | | | |
|---|---|---|---|
| 3,068,692 A | 12/1962 | Morgan | |
| 3,780,566 A | 12/1973 | Smith et al. .................... | 73/23 |
| 4,334,430 A | 6/1982 | Hansen et al. ................. | 73/189 |
| 4,669,304 A * | 6/1987 | Caragata ................... | 73/170.07 |
| 6,046,679 A | 4/2000 | Cosyns ..................... | 340/815.4 |
| 6,114,964 A | 9/2000 | Fasano ........................ | 340/632 |
| 6,252,510 B1 | 6/2001 | Dungan ....................... | 340/632 |
| 6,670,887 B2 | 12/2003 | Dungan | |
| 6,761,065 B2 | 7/2004 | Haupt et al. ............. | 73/170.02 |
| 2003/0156009 A1 | 8/2003 | Boulot | |
| 2004/0075566 A1 | 4/2004 | Stepanik et al. | |
| 2005/0253929 A1 | 11/2005 | Kock | |

FOREIGN PATENT DOCUMENTS

| | | | |
|---|---|---|---|
| CA | 2 345 898 | * | 11/2002 |
| GB | 461195 A | | 2/1937 |
| GB | 1 277 392 A | | 6/1972 |
| JP | 405342485 A | * | 12/1993 |
| WO | WO 80/01416 A | | 7/1980 |
| WO | WO 00/13010 A | | 3/2000 |

* cited by examiner

*Primary Examiner*—Van T. Trieu
(74) *Attorney, Agent, or Firm*—Abelman, Frayne & Schwab

(57) ABSTRACT

A hazardous gases and wind direction sensor includes a housing having a hazardous gas sensor. The gas sensor sends an output signal to a transmitter at a predetermined frequency upon detecting a hazardous gas. Wind detection is provided by eight LEDs aligned with eight corresponding photocells disposed in the housing, where each photocell represents a topographical direction and is adapted to provide an output signal associated with a particular wind direction at a predetermined frequency. A disk is coupled to a rotatable shaft in the housing and positioned between the LEDs and photocells. The shaft is coupled to a wind direction indicator such as a windsock. The disk has a slot sized to allow light to pass from one of the LEDs to its corresponding photocell, which sends an output signal to enable a switching circuit in the transmitter. The switching circuit enables the output signal at a predetermined frequency to be transmitted to a receiver.

23 Claims, 6 Drawing Sheets

GAS ALARM SYSTEM WITH WIND DIRECTION INDICATOR

FIELD OF THE INVENTION

This invention relates to the field of hazardous gas monitoring, and specifically to an early-warning system for detecting hazardous gases in the environment.

BACKGROUND OF THE INVENTION

Toxic gas monitoring systems are well known. Generally, gas monitors are placed around chemical producing facilities such as a chemical processing or hydrocarbon producing plants. These monitoring systems are configured to monitor for the presence of toxic and/or combustible chemicals. In addition to monitoring for the presence these chemicals, typically in parts per million or lower explosive limits, these detectors can also detect other important information, such as wind speed and direction, temperature and other weather conditions. This information is then relayed to some sort of output system. For instance, the information can be relayed back to the control center of a chemical plant and be displayed on a computer terminal or be comprised in a computer printout.

In U.S. Pat. No. 3,068,692, a meteorological telemetering device detects wind direction and speed. The device utilizes pairs of light sources and photocells that are aligned with each other and represent various points of the compass. A first disk coupled for rotation with a wind vane has a shaped window of width varying in accordance with a selected mathematical relationship, and a second disk including a plurality of spiraling slots is coupled for rotation to and anemometer. The two disks are free to rotate under the control of their moving elements and interrupt light reaching the four photocells, as determined by the first disk and the speed of the second disk. With proper positioning and dimensioning of the apertures in the first and second disks, one or two of the photocells will be energized for any given wind direction, and the energized photocells will receive pulses of light. The total number of pulses is a function of the wind velocity, and the distribution of pulses between the one or two energized photocells is a function of wind direction. The four photocells are connected through time controlled gates to decade counters, so that the "X" and "Y", components of wind speed and direction are recorded or stored for transmission to a central recording station. Although the device provides wind direction and velocity, it does not provide any gas sensing capabilities. Further, the technique used to determine wind direction is complex, since it is based on mathematical formulas associated with the complex shape of the window in the first disk.

In U.S. Pat. No. 3,708,566, a device is disclosed for continuously sampling the atmosphere in the direction of the wind to monitor, detect, measure and record the amount of a given constituent in the atmosphere by providing a plurality of conduits each having an inline valve in a normally closed position. The conduits and valves are associated with a wind direction. A particular valve in a conduit is opened in response to a wind detector identifying wind direction and sending a signal to open a corresponding valve in the conduit. Once a valve is open, air enters the conduit and flows to an air sample analyzer, where the constituents in the air sample can be determined. Although the device detects direction of wind and samples the air corresponding to, the direction of the wind, the device requires mechanical parts, such as the valves and conduits, and does not provide any warning or alarm conditions in the event of harmful chemicals found in the air.

In U.S. Pat. No. 6,252,510, a wireless toxic gas monitoring system is disclosed. The system implements multiple toxic gas monitors (detectors) that are placed around a plant and transmits information, such as type of gas, wind direction and wind speed, via a wireless medium to a receiver at a central control station. Although the system provides for an array of gas monitoring detectors to be located around a plant, the gas monitoring detectors are complex in terms of electro-mechanical components. In particular, each gas monitoring detector utilizes a microprocessor for running application programs, user interfaces (e.g., a display panel, keyboard, and the like), a power supply, among other components, which are costly to set up and implement in terms of maintenance and labor to operate.

Accordingly, there is a need in the art for a simplified, yet improved gas and wind detection system capable of detecting harmful gases in the environment and the direction of the wind, and providing an early-warning system to alert personnel in the vicinity of such dangerous conditions. Further, there is a need to provide the early-warning detection system in a manner that alerts personnel so that they can retreat away from the path of the oncoming harmful gases. Moreover, there is a need to implement a gas alarm and wind indicator system that is highly reliable in terms of the components used and that can be constructed and operated in a cost effective manner.

SUMMARY OF THE INVENTION

The above needs are met and other advantages achieved by the system of the present invention that includes a sensor, a transmitter and at least one receiver having an alarm and wind direction display. The sensor includes a housing for at least one gas sensor for detecting one or more hazardous gases. The gas sensor is coupled to the sensor housing and adapted for communicating an output signal associated with the hazardous gas at a distinctive predetermined frequency when a detected gas exceeds a predetermined threshold.

The housing also includes a rotatable shaft that is positioned along a central longitudinal axis through the housing and adapted for receiving a vertical mast having a means for indicating wind direction, such as a windsock or wind vane.

At least one light source and a plurality of photocells are disposed in the housing. Each of the photocells circumscribe the central shaft, and are positioned proximate the at least one light source. Each photocell represents a topographical direction, and is adapted to provide an output signal associated with a particular wind direction at a predetermined frequency.

A rotatable disk is fixedly coupled to the shaft and positioned between the at least one light source and plurality of photocells. The rotatable disk turns in unison with the shaft, mast, and windsock in response to the directional changes of the wind. The disk includes a slot sized to allow light to pass from the at least one light source to a particular photocell, wherein the slot is aligned between the at least one light source and the particular photocell based on wind direction. The slot permits communication of an output signal associated with wind direction from the particular photocell at its predetermined frequency to the transmitter.

The transmitter has a plurality of signal generators that continuously produce an output signal, such as a sine wave, having a predetermined frequency that is associated with a directional point on the compass. For example, eight signal generators are utilized to provide an output signal for the directions of N, NE, E, SE, S, SW, W, and NW. Each output signal is at a different frequency, such as 1 KHz, 2 KHz, 3 KHz, and so on up to 8 KHz. The eight signals are blocked from transmission by a corresponding switching circuit associated with each signal generator. The switching circuits are normally in an off state to prevent transmission of the output signals to the receivers.

A switching circuit is triggered on in an instance when the slot of the disk is aligned between a paired LED and photocell. The output signal from the photocell is coupled to a corresponding switching circuit, which triggers the switching circuit to an ON condition, thereby enabling the transmitter to transmit the corresponding output signal having a particular frequency to the receivers, illustratively via a coaxial cable. In this manner, the transmitter will transmit only one output signal from a signal generator at a time to the receivers, and such output signal is representative of a direction in which the wind is heading.

Each receiver illustratively includes eight bandpass filters, eight switching circuits, and eight receiver LEDs. Each bandpass filter, switching circuit and LED corresponds to one of the signal generators associated with a direction. The bandpass filters have center frequencies corresponding to their corresponding signal generators. When a band pass filter receives an output signal, if the frequency of the output signal matches its center frequency, the bandpass filter sends the received output signal to its corresponding switching circuit. The switching circuit is enabled upon receiving the signal from the bandpass filter, and sends a signal to illuminate a corresponding LED, which indicates the direction of the wind to viewers of the receiver. The receiver LEDs are normally in an off state, and will be illuminated only upon the receiver receiving the output signal from a signal generator that has been enabled by the slot in the disk aligning between a paired LED and photocell associated with the current wind direction.

Similar circuitry is used in the transmitter and receivers for sounding an alarm during a hazardous gas condition. The gas sensor sends an output signal to a switching circuit associated with a signal generator, which also generates an output signal having a particular frequency. The receivers include a bandpass filter, switching circuit and a siren for receiving and producing an audible alarm in the event of the detection of the harmful gases.

BRIEF DESCRIPTION OF THE DRAWINGS

The present invention is described in more detail below and with reference to the following drawings in which.

Figure 1:
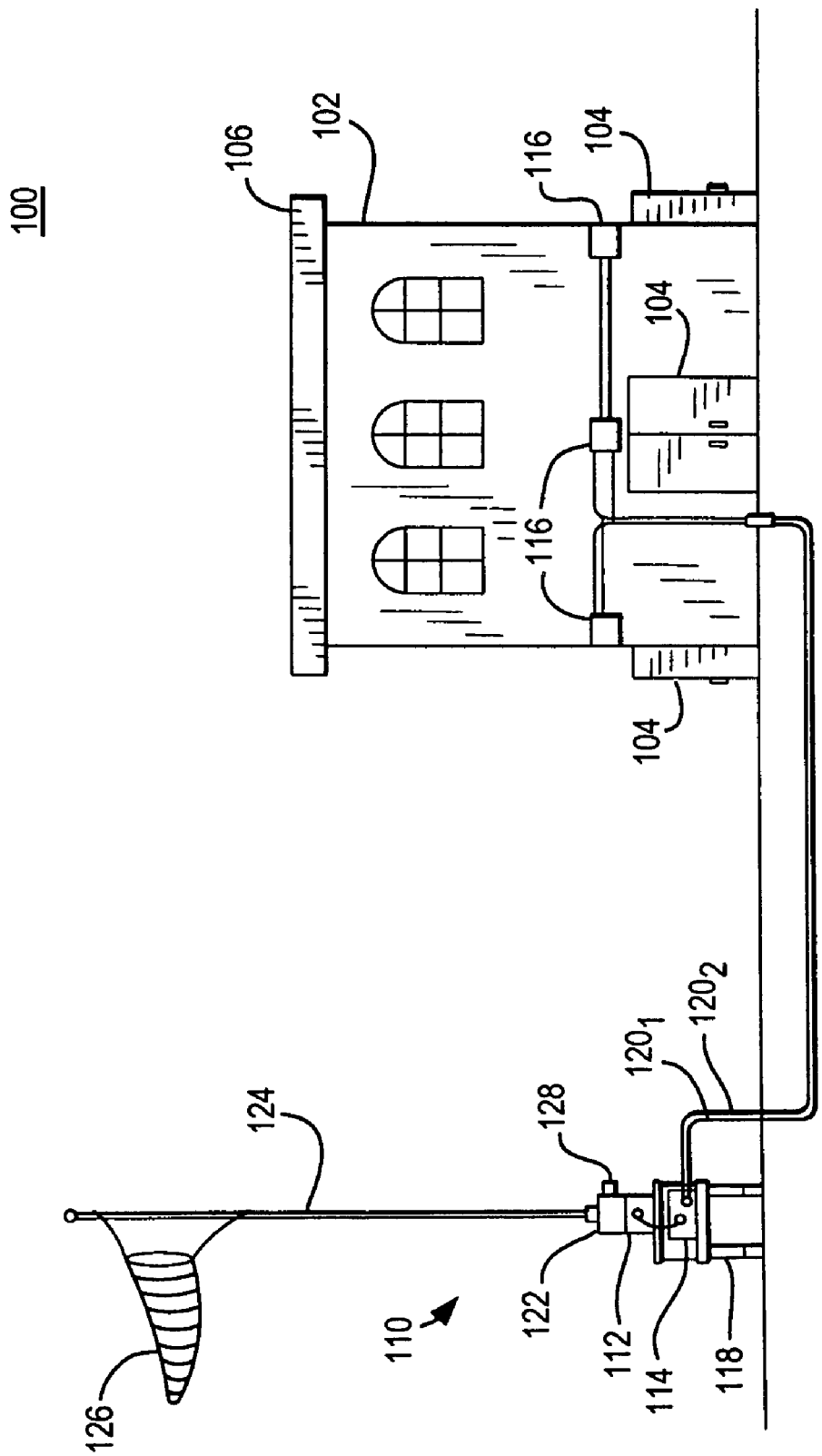
FIG. 1 illustrates a gas and wind direction sensor monitoring system in accordance with the invention for detecting hazardous gases and wind direction around an environment to be protected.

To facilitate the understanding of the invention, the same reference numerals have been used, when appropriate, to designate the same or similar elements that are common to the figures. Further, unless stated otherwise, the drawings shown and discussed in the figures are not drawn to scale, but are shown for illustrative purposes only.

DETAILED DESCRIPTION OF THE PREFERRED EMBODIMENTS

FIG. 1 depicts an outdoor environment 100 to be protected by the gas alarm and wind direction indicating system 110 of the present invention. The environment 100 can be any area and adjoining areas, such as a hydrocarbon plant, or a chemical plant, among others, that may be subjected to hazardous gas condition. As illustratively shown in FIG. 1, at least one building 102 having one or more access points (entrances/exits) 104 is protected by the gas alarm and wind detection system 110 of the present invention. The gas alarm and wind detection system 110 comprises a gas alarm and wind detection sensor 112, a transmitter 114, and at least one receiver 116. As illustratively shown, the sensor 112 and transmitter 114 are illustratively mounted on a platform or stand 118 external to the building 102, while the one or more receivers containing alarm devices are mounted proximate an access point (i.e. doors) within the building 102.

The sensor 112 comprises a central housing 122 adapted to receive a vertical mast 124 having a windsock 126 coupled at the top of the mast 124. The mast 124 rotates from the housing 122 of the sensor 112 in response to changes in direction of the wind as the windsock 126 "catches" the wind. Preferably, the windsock is attached to the top of the mast 124 at a level greater than the height of the roof 106 of the building 102. Positioning the windsock 126 higher than the roof 106 of the building is preferable because the wind will not be blocked by the building 102.

As will be discussed below in further detail with respect to FIGS. 2 through 5 the mast 124 is coupled to an internal shaft positioned within the housing 122. A disk having a slot formed therein is fixedly attached to the shaft, such that the mast, shaft and disk rotate in unison in response to directional changes of the wind. As the disk rotates, the slot will be aligned between one of a plurality of paired light sources and corresponding photo sensors, each of which corresponds to a designated point on the compass, such as N, NE, E, SE, S, SW, W and NW. Once the slot of the disk is aligned between a light source and corresponding photo sensor, the photo sensor is able to receive the light emitted from the corresponding light source. The photo sensor sends an output signal to the transmitter 114, which transmits a directional output signal having a predetermined frequency to the receivers 116, illustratively via coaxial cable $120_1$. The output signal received by the receiver from the transmitter serves as a trigger to provide a directional signal that turns on an LED corresponding to the direction of the wind.

Furthermore, a gas sensor 128 is also coupled to the housing 122 and will provide an output signal to the transmitter 114 upon the detection of a harmful or combustible gas, such as butane, methane, hydrogen, isobutene, ethanol, carbon monoxide, among other harmful or hazardous gases. In one embodiment, the output signal associated with the gas detection is transmitted to the receiver via a second coaxial cable $120_2$. Accordingly, the sensor 112 continuously tracks the wind direction, and the transmitter 114 continuously transmits an output signal associated with a particular wind direction signal to the receivers 116, where the output signal has a predetermined frequency that is associated with each point on the compass. However, the transmitter 114 will only transmit an output signal to the one or more receivers 116 in response to the gas sensor 128 detecting at least one type of harmful gas at some predetermined level (i.e., parts per million).

As discussed below in further detail with respect to FIG. 5, each of the receivers 116 is provided with a plurality of LEDs, where each LED corresponds to a particular compass point, as well as an audible alarm (e.g., siren) for providing an audible warning in response to the detection of a harmful gas.

Preferably the receivers 116 are positioned proximate the access points 104 of the building 102 to enable the inhabitants to quickly identify the direction of the wind under an alarm condition, and accordingly evacuate in a direction opposite or upwind from the flow of the harmful gases.

Figure 2:
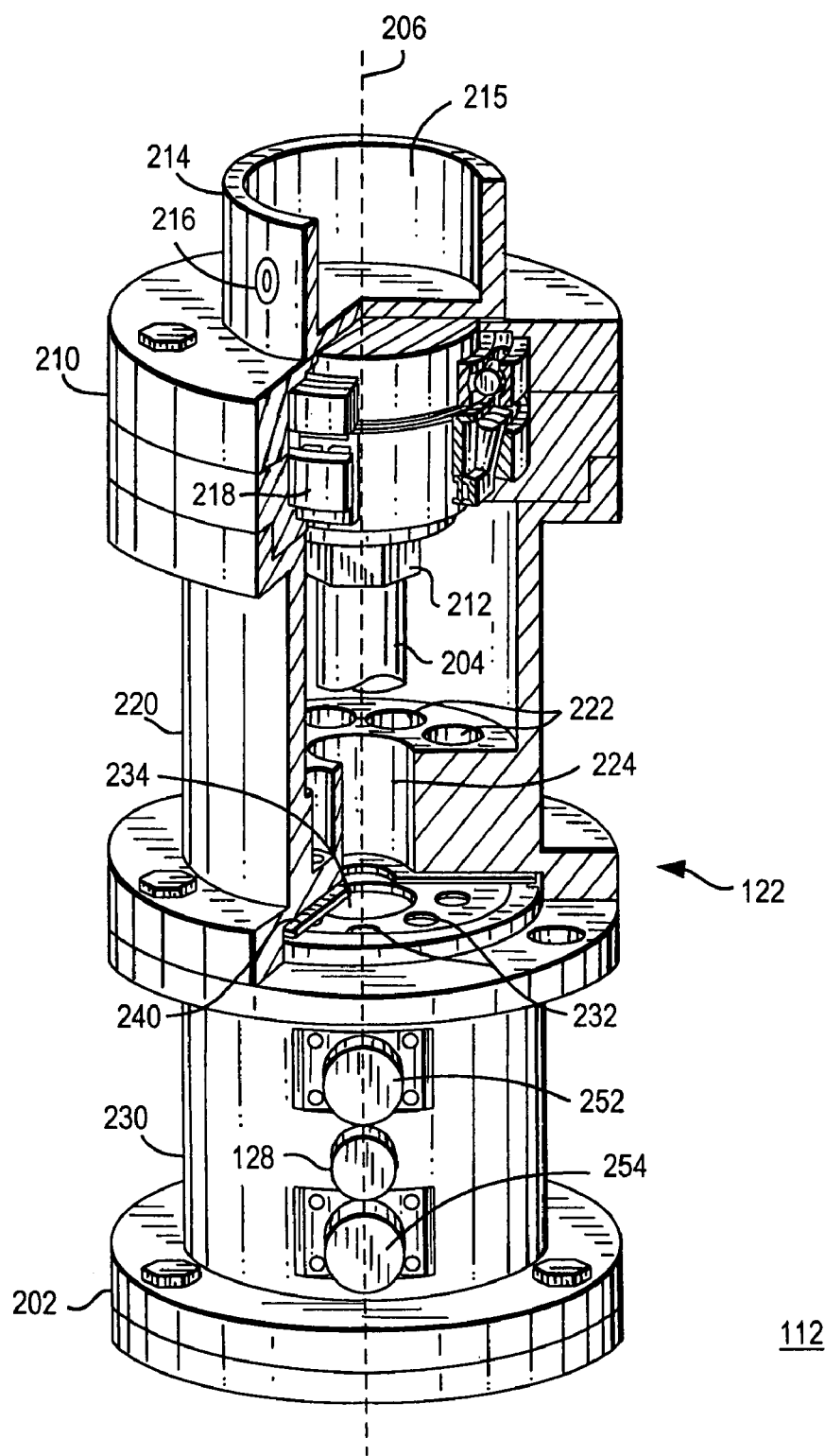
FIG. 2 is a side perspective view, partly in section, of the gas and wind direction sensor of FIG. 1.

Referring to FIG. 2, the gas and wind detection sensor 112 comprises a lower bearing casing or base 202, an upper bearing casing 210, an LED casing 220, and a photocell casing 230, which collectively form the housing 122 of the sensor 112. In one embodiment, the photocell casing 230 is disposed over the base 202, the LED casing 220 is disposed over the photocell casing 230, and the upper bearing casing 210 is disposed over the LED casing 220. Preferably, the sensor housing 122 is substantially cylindrical in shape and includes a cylindrical shaft 204 extending through the central longitudinal axis 206 of the housing 122. The shaft 204 extends from the upper bearing case 210 down through the LED casing 220 and the photocell casing 230 and into the base 202 via a shaft channel 224 formed along the center axis 206 of the housing 122.

A mast receptacle 214 is attached to an upper portion of the shaft 204, illustratively, via a receptacle fitting 212. For example, the upper portion of the shaft 204 can be threaded into a lower position of the mast receptacle 214. Those skilled in the art will appreciate that other techniques may be used to attach the mast receptacle 214 to the upper portion of the shaft 204, such as by a pin, welding, among other conventionally known techniques.

The upper bearing casing 210 circumscribes the lower portion of the mast receptacle 214, such that upper bearings 218 are formed between the outer surface of a lower portion of the mast receptacle 214 and the inner wall of the bearing casing 210. Furthermore, the base 202 of the sensor assembly 122 includes a plurality of lower bearings (not shown) that are spaced to receive the lower position of the shaft 204 between an internal surface of the base and an outer surface of the shaft 204. The upper bearings 218 and lower bearings circumscribe the shaft 204 to permit the shaft to rotate along the central longitudinal axis 206.

The upper portion of the mast receptacle 214 extends above the bearing casing 210 and includes an opening 215 sized to receive the lower portion of the mast 124. The opening 215 is formed such that the mast 124 extends vertically from the mast receptacle 214. The mast 124 can be secured in the mast receptacle 214 via a set screw 216. A person skilled in the art will appreciate that other techniques may be used to secure the lower portion of the mast 124 into the mast receptacle 214, such as by a threaded bolt pin, pins, welding or other fasteners conventionally known in the art.

Figure 3:
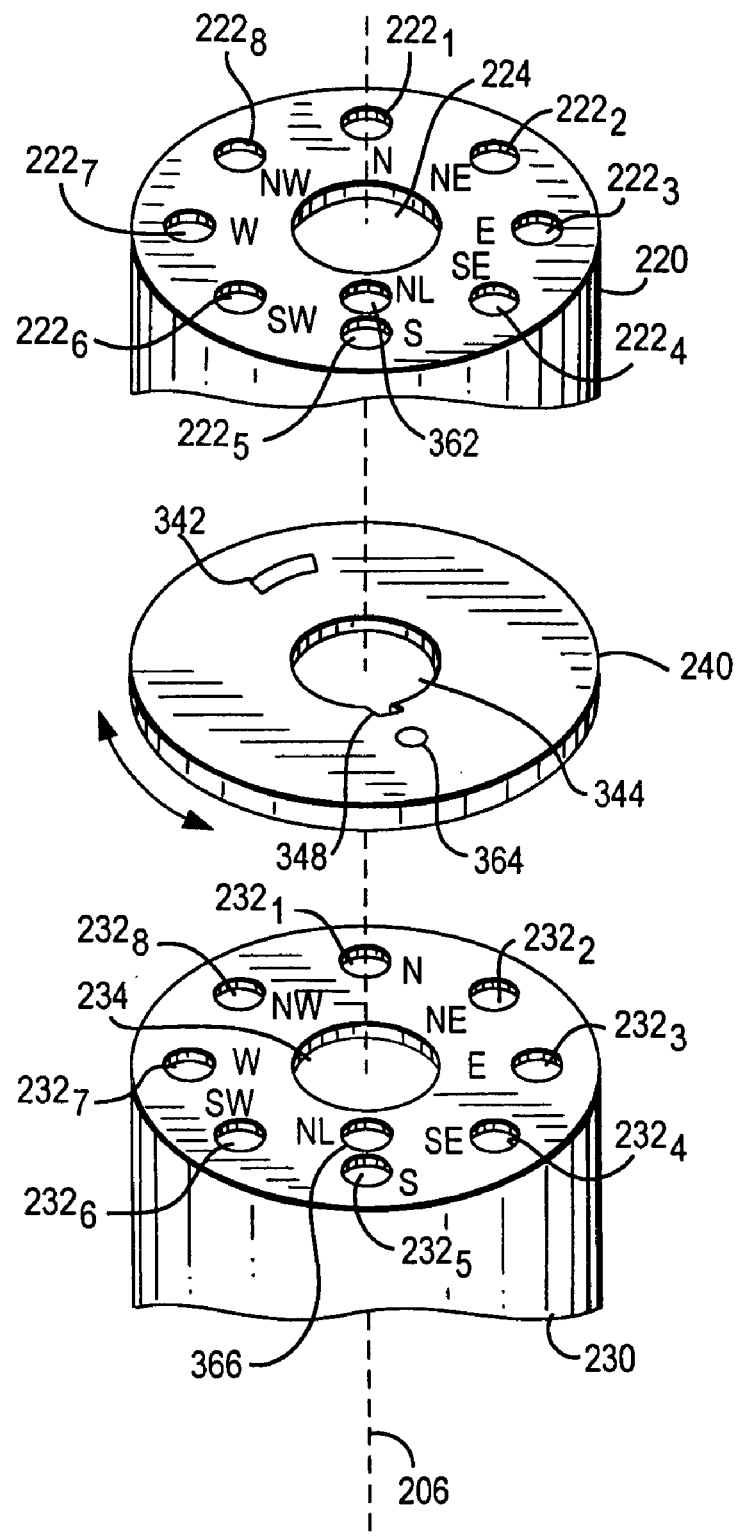
FIG. 3 is an exploded side perspective view of the wind direction sensor of FIG. 2.

Referring to FIG. 3, a portion of the LED casing 220, the disk 240, and photo sensor casing 230 are shown aligned along central longitudinal axis 206. The LED casing 220 includes a channel 224 sized to circumscribe the shaft 204.

A plurality of light sources 222 is positioned to circumscribe the shaft 204 within the LED casing 220. The plurality of light sources 222 illustratively include eight light sources $222_1$ through $222_8$, which are radially spaced equidistant from the center of the channel 224, as well as evenly spaced circumferentially around the shaft 204. Each of the light sources 222 is associated with a directional point on a compass, such as N, NE, E, SE, S, SW, W, and NW. Preferably, the plurality of light sources 222 include light emitting diodes (LEDs), however one skilled in the art will appreciate that other types of light sources may be utilized, such as incandescent bulbs, optical cabling, gel cables, among other light sources.

The photocell casing 230 comprises a channel 234 that is sized to accommodate and circumscribe the shaft 204. Furthermore, a plurality of light sensors 232 is positioned to circumscribe the shaft 204 within the photocell casing 230. The plurality of light sensors 232 illustratively include eight light sensors $232_1$ through $232_8$, which are radially spaced equidistant from the center of the channel 234, as well as evenly spaced circumferentially around the shaft 204. Each of the light sensors 232 is also associated with a directional point on a compass, such as N, NE, E, SE, S, SW, W, and NW. The light sensors 232 are preferably photocells, however one skilled in the art will appreciate that the light sensors may be any other transducer capable of converting light into an electrical signal.

In a preferred embodiment, each one of the plurality of LEDs 222 is axially aligned with a corresponding one of the eight photocells 232. Referring to FIG. 3, LED $222_1$ is axially aligned with photocell $232_1$, LED $222_2$ is axially aligned with photocell $232_2$, and so forth. As such, each photocell 222 has a corresponding light source 222 to form a paired light and photocell. In the preferred embodiment shown herein, there are eight paired LEDs and corresponding photocells. The light sources 222 and photocells 232 are powered by a power supply (not shown) illustratively coupled to the housing 122 via connector 252. One skilled in the art will appreciate that an internal power supply can alternatively be provided within housing 122, such as a local battery.

Referring to FIG. 2, a space or gap 242 is provided between the LED casing 220 and bearing casing 230, and is sized to accommodate disc 240 as it rotates about the longitudinal axis of the shaft 204. Disc 240 includes a shaft channel 344 that is sized to circumscribe the shaft 204. The disc 240 is fixably attached around the shaft 204, illustratively, by providing a recess 348 that is sized to accommodate a conforming protrusion or detent 402 (FIG. 4) formed on the outer portion of the shaft 204. Referring to FIG. 1, the disc 240 rotates in unison with the shaft 204 in response to directional changes of the wind.

The disc 240 is fabricated from a non-transparent material such as aluminum, plastic, or any other non-transparent material capable of rotating without deflecting across a plane perpendicular to the longitudinal axis 206 within the gap 242. In other words, the disk rotates freely within the gap 242. The disc 240 includes a slot 342 that is sized to permit light to pass from a single LED to its corresponding photocell 232 when the slot 342 of the disc 240 is aligned therebetween. Accordingly, as the disc rotates along with the shaft 204, the slot 342 will, at any given time, allow the light from one of the LEDs 222 to pass through to its corresponding photocell 232. The function of the photocell 232 is to convert the light received into an electrical signal that is sent to a corresponding switching circuit 412 in the transmitter 114, as discussed along with respect to FIG. 4.

In the embodiment where there are eight photocells 232 representing each of the eight compass points, the slot 342 extends a distance radially outward from the center of the shaft channel 234 equal to and corresponding with the radius of the photocells 232 from the channel 234. Further, the slot 342 is arcuate in shape and extends a distance equivalent to 45° to allow light from a single LED to pass through and be received by its corresponding photocell. In other words, the slot 342 is sized to permit only one of the paired LEDs and photocells to be active at any given time as the disk 240 rotates between the LED casing 220 and photo sensor casing 230.

Although eight paired light sources and photocells is preferable, such quantity is not limiting, and as a person skilled in the art will appreciate that other quantities of paired light sources and photocells can be utilized. Further, a lesser number of light sources can be used in conjunction with the illustrative eight photo sensors. For example, a single light source can be utilized to provide light to all of the photocells. In this latter embodiment, the slot 342 in the disk 140 will still only permit light from the single light source to pass through a single photocell, as discussed above.

Figure 4:
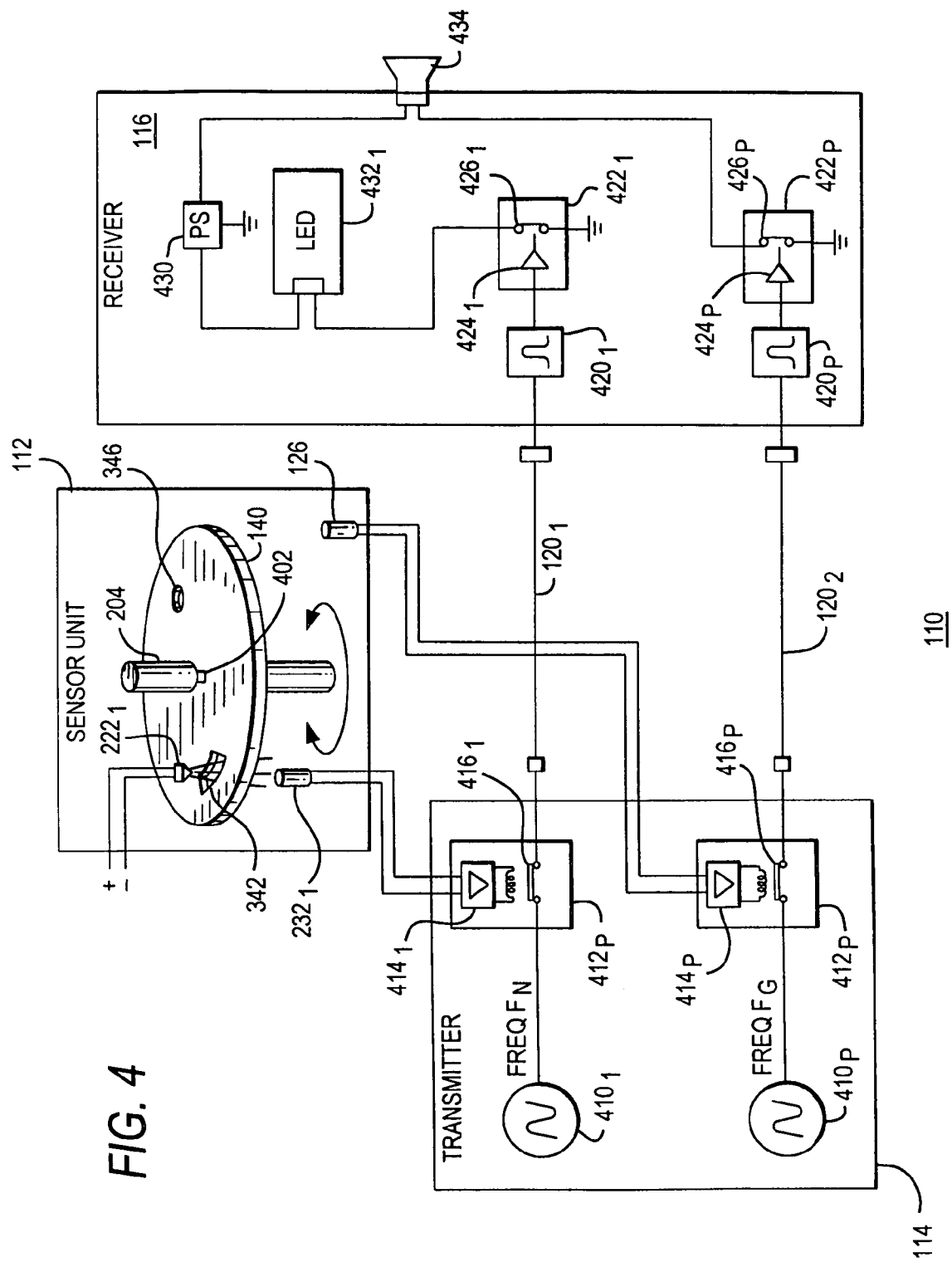
FIG. 4 is a schematic diagram of a first embodiment of the gas and wind sensor, a transmitter and at least one receiver of the present invention.

FIG. 4 depicts a partial schematic block diagram of the sensor unit 112, the transmitter 114 and a receiver 116. For sake of clarity and illustrating the present invention, the circuitry for a single paired LED and photo sensor associated with a particular direction is illustratively shown. For example, LED sensor $222_1$ is illustratively shown aligned with photo sensor $232_1$, and disc 140 is shown rotating with shaft 204 such that the slot 342 is aligned between the LED $222_1$ and photo sensor $232_1$ within the sensor unit 112. Light emitted from the LED $222_1$ passes through the slot 342 and the photo sensor $232_1$ converts the light into an electrical signal that is sent to the transmitter 114.

The transmitter 114 comprises a plurality of signal generators $410_1$ through $410_p$ (collectively signal generators 410) and a corresponding plurality of switching control circuits $412_1$ through $412_p$ (collectively switching circuits 412) coupled to an output of a signal generator 410. Each of the signal generators 410 and switching circuits 412 correspond with a paired LED and photo cell associated with a direction on the compass. In a preferred embodiment, there are eight signal generators $410_1$ through $410_8$ and corresponding switching circuits $412_1$ through $412_8$ associated with the wind sensors, and one signal generator and corresponding switching circuit associated with the gas sensor.

Each signal generator 410 continually produces an output signal having a magnitude and particular frequency to the corresponding to a direction on the compass. The output signal from the signal generator 410 is sent to its corresponding switching circuit 412. The switching circuits 412 are normally in an OFF state, thereby preventing the transmitter 114 from transmitting the continuous output signal from the signal generating 410. The switching circuits 412 allow the output signal from the signal generator 410 to be transmitted to the receiver 116 in response to the output from the photocell 232 triggering the switching circuit 412 into an enabled condition.

As illustratively shown in FIG. 4, the switching circuit optionally includes an amplifier $414_1$ for amplifying the output signal from the photocell $232_1$ to a switch $416_1$ that switches from the OFF state to an ON state. Each switch 416 can be single pole single throw (SPST) switch, such as mechanical or solid state relay which are in the normally open position, among other conventionally known switches.

Accordingly, as the disk rotates and the slot 342 is aligned between the LED $222_1$ and the photocell $232_1$, the output signal from the photocell is sent to the switching circuit $412_1$ of the transmitter 114, where the signal is amplified by the amplifier $414_1$ and used to enable the switch $416_1$ thereby allowing the continuous output signal generated by the signal generator $410_1$ to be transmitted to the receiver 116, via the coaxial cable $120_1$.

Similarly, the gas sensor 128 of the sensor unit 112 is capable of generating an output signal that is sent to the transmitter 114, which in turn, transmits a continuous output signal having a particular magnitude and frequency to the receiver 116. Specifically, the transmitter 114 includes a designated signal generator $410_p$ that produces a continuous output signal of a particular frequency that is sent to a corresponding switching circuit $412_p$, which when triggered by the output signal from the gas sensor 128, will enable the transmitter 114 to transmit the output signal from the signal generator $410_p$ to one or more the receivers 116 via a second coaxial cable $120_2$.

Accordingly, the signal generators 410 of the transmitter 114 continually generate an output signal at a particular frequency associated with each direction or point of the compass. However, since the switching circuits 412 are normally in an OFF state, the transmitter 114 is prevented from transmitting the output signal from the signal generator 410 to the receivers 116, except for an output signal corresponding to a time where the slot 342 of the disc 140 is aligned between a paired LED and photocell associated with a direction of the wind. Thus, the switching circuits 412 serve as gateways to permit the transmitter 114 to transmit a particular output signal having a particular frequency associated with a particular wind direction to the receiver 116.

In one preferable embodiment, the signal generators 410 are sine wave generators that produce a sine wave having a voltage magnitude of −5 volts to +5 volts. However, the frequencies of the sine wave produced by the signal generators are different, and are set to a predetermined frequency associated with a direction on the compass. For example, the sine wave generator $410_1$ associated with the direction of north is 1 KHz, the sine wave generator $410_2$ associated with the direction of NE is 2 KHz, the sine wave generator $410_3$ associated with the direction of east is 3 KHz, and so forth.

The receivers 116 are illustratively coupled to the transmitter 114 via the pair of coaxial cables $120_1$ and $120_2$ (collectively, coaxial cables 120), as discussed above with respect to FIG. 1. That is, the first coaxial cable $120_1$ is used to transmit the signal associated with wind direction, while the second coaxial cable $120_2$ is used to transmit the signal associated with detection of a hazardous gas.

The receivers 116 comprise a plurality of bandpass filters $420_1$ through $420_p$ (collectively bandpass filters 420), a plurality of switching circuits $422_1$ through $422_p$ (collectively switching circuits 422), a plurality of LEDs 432, a power supply 430, and an audible alarm (e.g., siren) 434. A band pass filter 420, a switching circuit 422, and a receiver LED 432 are each associated with one of the directions on the compass. For example, as shown in FIG. 4, bandpass filter $420_1$, switching circuit $422_1$, and LED $432_1$ are illustratively associated with the direction of North. Each of the bandpass filters 420 associated with the LEDs 432 are coupled to an input connector (not shown) from the coaxial cable $120_1$ and have a center frequency corresponding to the distinctive frequency associated with the corresponding signal generators 410 of the transmitter 114. Similarly, the bandpass filter $420_p$ associated with the gas detection circuitry is coupled to an input connector (not shown) from the coaxial cable $120_2$ and has a center frequency corresponding to the distinctive frequency (Fg) associated with the corresponding signal generator $410_p$ of the transmitter 114.

For example, if signal generator $410_1$ produces a sine wave having a frequency of 1 KHz, then a band pass filter $420_1$ having a center frequency of approximately 1 KHz is provided in the receiver 116. The output of the bandpass filter 410 is coupled to the input of corresponding switching circuit $422_1$, which has an output coupled to corresponding receiver LED $432_1$. Similarly, for the bandpass filter $420_p$ and corresponding switching circuit $422_p$ associated with the gas sensor 128, the output of bandpass filter $420_p$ is coupled to the input switching circuit $422_p$, which has an output coupled to the gas alarm 434.

It noted that the signal frequency used for transmitting the gas detection signal can be at the same frequency or at a different frequency used for detecting wind direction from the LEDs 432, since the gas detection signal is transmitted over a separate coaxial cable $120_2$ from the wind detection signal, which are transmitted over coaxial cable $120_1$. Thus, the gas detection signals and wind direction signals are isolated from each other.

The gas alarm 434 and the receiver LEDs 432 are powered by the power supply 430 and switched on by the switching circuits 422. The receiver LEDs 432 and gas alarm 434 are normally in an off state, unless one of the bandpass filters 420 passes its associated sine wave signal from the transmitter 114 to its corresponding switching circuit 422, which provides an output signal to the corresponding receiver LED 432 and/or gas alarm 434 to activate the receiver LED and/or gas alarm. As discussed above with respect to the transmitter 114, each of the switching circuits 422 can also include an amplifier 424 to amplify the output signal from the bandpass filter 420, and send the amplified signal to a corresponding switch 426, which activates the receiver LED 432.

In one preferred embodiment, the signal generators $410_1$ through $410_p$ produce sine wave having respective frequencies of 1 KHz, 2 KHz, 3 KHz, 4 KHz, 5 KHz, and so on. Moreover, each of the bandpass filters $420_1$ through $420_p$ associated with each of these signal generators has a center frequency of 1 KHz, 2 KHz, 3 KHz, 4 KHz, 5 KHz and so forth. In this matter, a signal having a particular frequency is produced in association with a particular wind direction and/or the sensing of a hazardous gas. Associating a particular frequency with a particular wind direction assures that the proper wind direction is always being shown, and therefore provides the added benefit of preventing an improper indication of wind direction being given at any time, especially during emergency situations.

Figure 5:
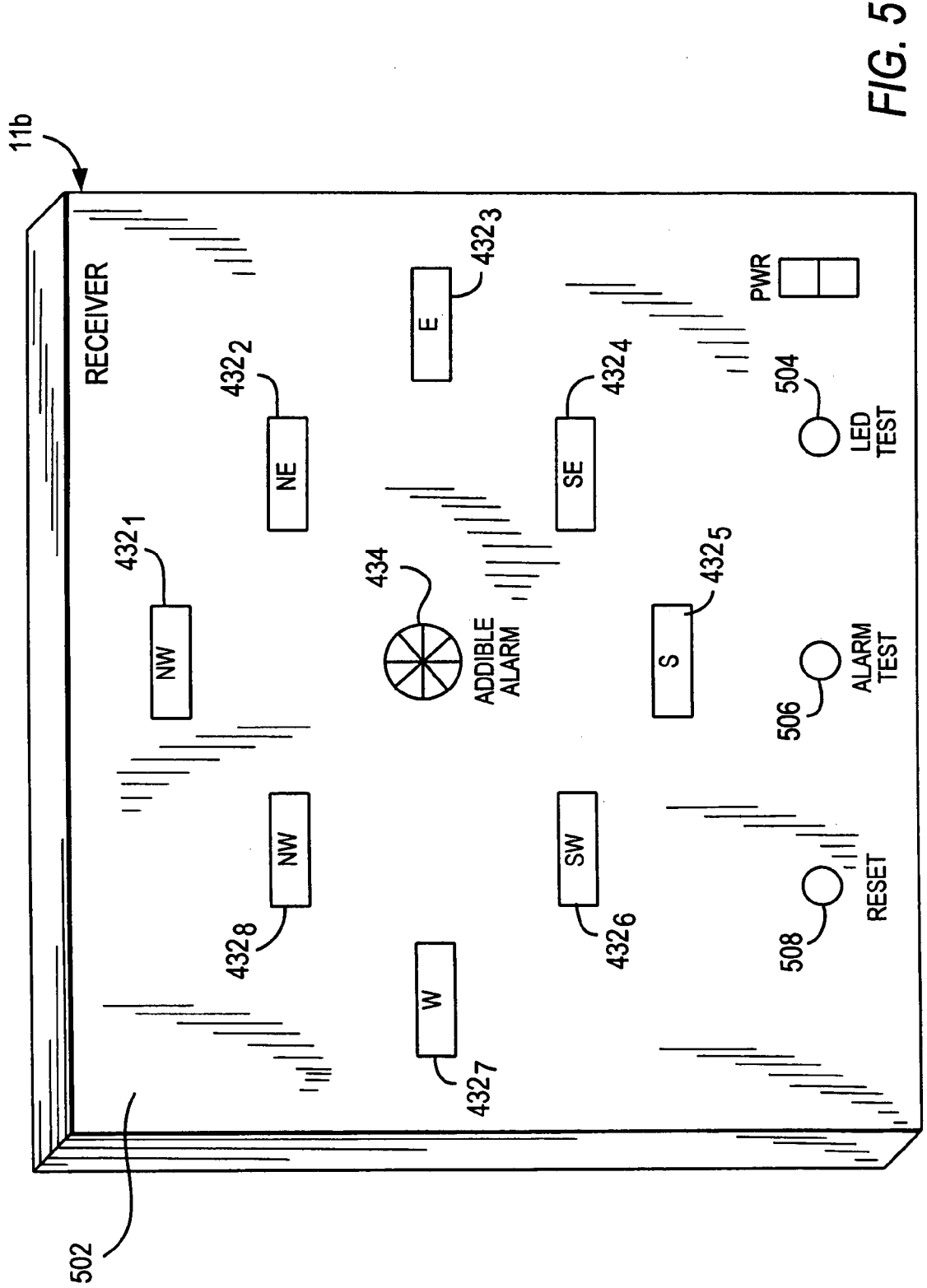
FIG. 5 is partial schematic diagram of an illustrative embodiment of the transmitter of FIG. 4 for generating a signal in response to identifying wind direction and/or detecting a hazardous gas.

Referring to FIG. 5, an illustrative layout of a receiver 116 is shown. The receiver 116 includes eight LEDs $432_1$ through $432_8$ (collectively LEDs 432) positioned on a front panel 302 of the receiver 116 and correspond to the directional points of a compass. Only one of the LEDs will illuminate at any particular time to indicate the direction of the wind. For example, if the wind is heading in a northwesterly direction, the windsock 126 will also turn in a northwesterly direction such that the mast 124 will rotate and cause the shaft 204 and disc 140 to rotate as well. The slot 342 in the disc 140 will align between the LED $222_8$ and photocell $232_8$ associated with the northwest direction, and the light emitted from the LED $222_8$ will pass through the slot 342 and be received by the photocell $232_8$. The photocell $232_8$ will convert the received light into an electrical output signal that is sent to its corresponding switching circuit $412_8$ in the transmitter 114. The switching circuit $412_8$ will turn on and allow the corresponding sine wave having a particular frequency produced by the signal generator $410_8$ to be transmitted through the coaxial cable $120_1$ to the receiver 116.

The bandpass filter $420_8$ associated with the northwest direction, which has a center frequency associated with the sine wave signal produced by the corresponding signal generator $410_8$, sends the output signal received from the transmitter 114 to the corresponding switching circuit $422_8$ to produce an output signal that is sent to the LED $432_8$ on the front panel of the receiver 116. Accordingly, the LED $432_8$ will illuminate to indicate that the wind direction is in the northwest direction.

When the wind changes direction, the windsock 126 and shaft 124 will rotate to cause the slot 342 of the disk to align with another paired set LED and photocell associated with the direction of the wind at that particular time. An LED 432 on the front panel 502 of the receiver 116 will accordingly turn on to indicate the change in wind direction.

The audible alarm 434 operates in a similar manner as discussed above with respect to the wind direction sensor except that the gas sensor 128 will produce an output signal based on a predetermined concentration of gases that is sensed in the area surrounding the sensor unit 112. For example, the gas sensor 128 can be any commercially available gas sensor capable of detecting one or more types of harmful gases, such as hydrogen, isobutene, propane, ethanol, methanol, carbon monoxide among other harmful or toxic gases with contents illustratively in a range of 500 parts per million (ppm) to 10,000 ppm. For example, in one embodiment, the gas sensor 128 is a model TGS 813 general purpose gas sensor with sensitivity to a wide range of combustible gases, which is manufactured by Figaro Engineering, Inc. of Glenview, Ill., USA.

An output signal from the gas sensor 128 triggers the switching circuit 412 in the transmitter 114 to allow a sine wave having a particular frequency that is generated from its associated signal generator 410 to transmit the distinctive sine wave over the coaxial cable $120_2$ to the receiver 116. The bandpass filter $420_p$ having a center frequency corresponding to the signal generator $410_p$ associated with the gas sensor 128 will pass the output signal to the corresponding switching circuit $422_p$, which will enable the audible gas alarm 434.

The prior art wind/gas detectors are susceptible to giving incorrect indications of wind direction, due to undesirable signal noise from the transmitters and receivers. Advantageously the present invention provides an output signal having a predetermined frequency associated with each topographical wind direction, as well as the gas sensor, to thereby eliminate false indications with respect to wind direction or sensing a hazardous gas.

The present invention includes a transmitter and receivers that have corresponding circuitry associated with each wind direction and gas detection. The nine illustrative transmitter/receiver wind/gas detection circuits are independent from each other and operate at different frequencies. The operational frequencies are spread apart from one another to allow for any drift that may occur, illustratively, by the signal generators or amplifiers of the transmitter. Accordingly, the appropriate wind direction or gas sensing circuitry of the receiver will properly detect and subsequently provide the correct wind direction and/or gas detection indicator in response to the specific frequency signal transmitted to the receiver over the coaxial cables.

Additionally, a single coaxial cable is all that is required for transmitting a wind detection signal to the receiver, thereby advantageously reducing the number of conductors required between the transmitter and receiver. That is, since only one wind direction signal is generated and transmitted at any time, a single coaxial cable can be used without concern of degradation to the signal from noise produced from the other signal generators.

Although the present invention is discussed in terms of using two coaxial cables $120_1$ and $120_2$, one skilled in the art will understand that wireless communications can alternatively be implemented between the transmitter 114 and receivers 116. In this latter embodiment, the transmitter 114 can transmit a wireless communications signal at a predetermined frequency associated with each wind direction and the gas sensor 128 to the receivers 116. The receivers 116 will "tune in" to the wireless signal at the particular frequency to turn on a receiver LED 432 in similar manner as discussed above.

In one embodiment, the receiver 116 can also an LED test button 504 for testing the LEDs 432 to ensure that they are functional and an alarm test button 506 for testing the audible alarm 434 to ensure that it is functional as well. Optionally, a reset button 508 can be provided on the front panel 502 to turn off the alarm 434 after the transmitter has stopped transmitting the output signal associated with the gas sensor 128. That is, the siren 434 will continuously sound off while there is a hazardous gas condition being detected by the gas sensor 128. Only after the hazardous gas levels fall below a particular concentration (ppm), a user can engage the reset button 508 to turn off the siren 434.

Referring to FIG. 1, when the wind and gas sensor 112 is initially set up, the sensor must be properly aligned such that the LED and photo sensor pairs are aligned with the directional compass points. Referring to FIG. 3, the present invention provides a guide, herein termed as "a north lock" (NL) that assists in properly aligning the sensor 112 to the compass points. The LED casing 220 includes an additional LED 362, and the photocell casing 230 includes a corresponding photocell 366 that is aligned with the LED 362. In one embodiment, the NL LED 362 and corresponding NL photocell 366 are positioned between the shaft 204 and the LED and photocell pair ($222_5$/$232_5$) associated with the southern direction. The disc 240 is further provided with an orifice 364 which when aligned between the NL LED 262 and the NL photocell 366, allows the photocell 366 to receive the light emitted from the LED 362, and thereby provide an output signal to indicate that the sensor is aligned with the compass point of due North.

Specifically, the installer uses a compass to initially align the north LED $222_1$ and corresponding photocell $232_1$ to due north. In one embodiment, the external surface of the housing includes labeling of the compass points proximate to the positioning of the paired LEDs/photocells within the housing. The installer then rotates the mast receptacle 214 until the orifice 364 is aligned with the line between the LED 362 and corresponding photocell 366. Once aligned, the NL photocell 366 produces an output signal that is sent to, illustratively, to an LED attached to the front panel of the transmitter 114. When the LED on the front panel of the transmitter illuminates, the installer is provided with indication that the slot 342 of the disc 240 is aligned with the LED/photocell pair associated with the northern direction. The installer can then secure the mast 124 in the mast receptacle 122 by tightening a fastener, such as the set screw 216 (FIG. 2). Once the mast 124 and windsock 126 are properly aligned and secured to the sensor 112, the wind and gas sensor system 110 is considered operational and can provide inhabitants within the building 102 with information regarding the direction of the wind, as well as any hazardous conditions.

The present invention provides an electronic wind and harmful gas detection system that senses the direction of wind with respect to the eight major directional points of the compass. The presence of harmful gases are also detected by a gas sensor, and both the wind direction and an alarm signal are transmitted via a communications medium, such as by coaxial cable, to one or more receivers positioned in a building, such as near an access point of a building. The transmitter transmits an output signal at a predetermined frequency associated with each directional signal, and the directional signal switches on the appropriate indicator identifying the direction of the wind. In this manner, an output signal of a particular frequency enables an indicator, such as an LED, to illuminate and display the wind direction. Further, in an instance where a hazardous gas is present, an additional output signal of a particular frequency is transmitted by the transmitter and received by the receiver to activate another indicator, such as a siren, to provide an audible alert.

The signal generators and switching circuits of the transmitter can be made using basic operational amplifiers and passive elements commercially available, thereby reducing the overall costs of the system. The use of LEDs for the wind detection helps to provide a reliable system requiring low levels of maintenance.

In the embodiment where coaxial cabling is utilized, only two coaxial cables are required, where a first cable is between the photo sensors and the transmitter, and the second coaxial cable is between the transmitter and the receiver. Multiple receivers (e.g., four receivers) can be coupled serially together to provide coverage at different access points in a building.

In one embodiment, an audible alarm can be connected to the outer surface of the gas alarm and wind detection sensor 112 or the platform 118 to provide an alert of a hazardous gas condition to persons in the vicinity of the sensor 112. Accordingly, the present invention provides an inexpensive and reliable communications device for providing personal safety in places of high occupancy, where workstations or emergency radio channels are not available.

In another embodiment where computers and/or workstations are available, the transmitter 114 can transmit an alert signal to a computer, such as a server or workstation, which is coupled to a network, such as a private network (intranet) or public network (Internet). In this latter embodiment, the computer receiving the alert signal can generate a general alert condition for broadcast to other networked computers.

The embodiments of the present invention shown and discussed herein are not considered to be limiting, as other embodiments are also contemplated. For example, although the transmitter of the present invention is discussed in terms of independent signal generators and corresponding switching circuitry associated with each wind direction, one skilled in the art of transmitters will appreciate that other circuits capable of transmitting output signals having various distinctive frequencies can also be implemented.

Figure 6:
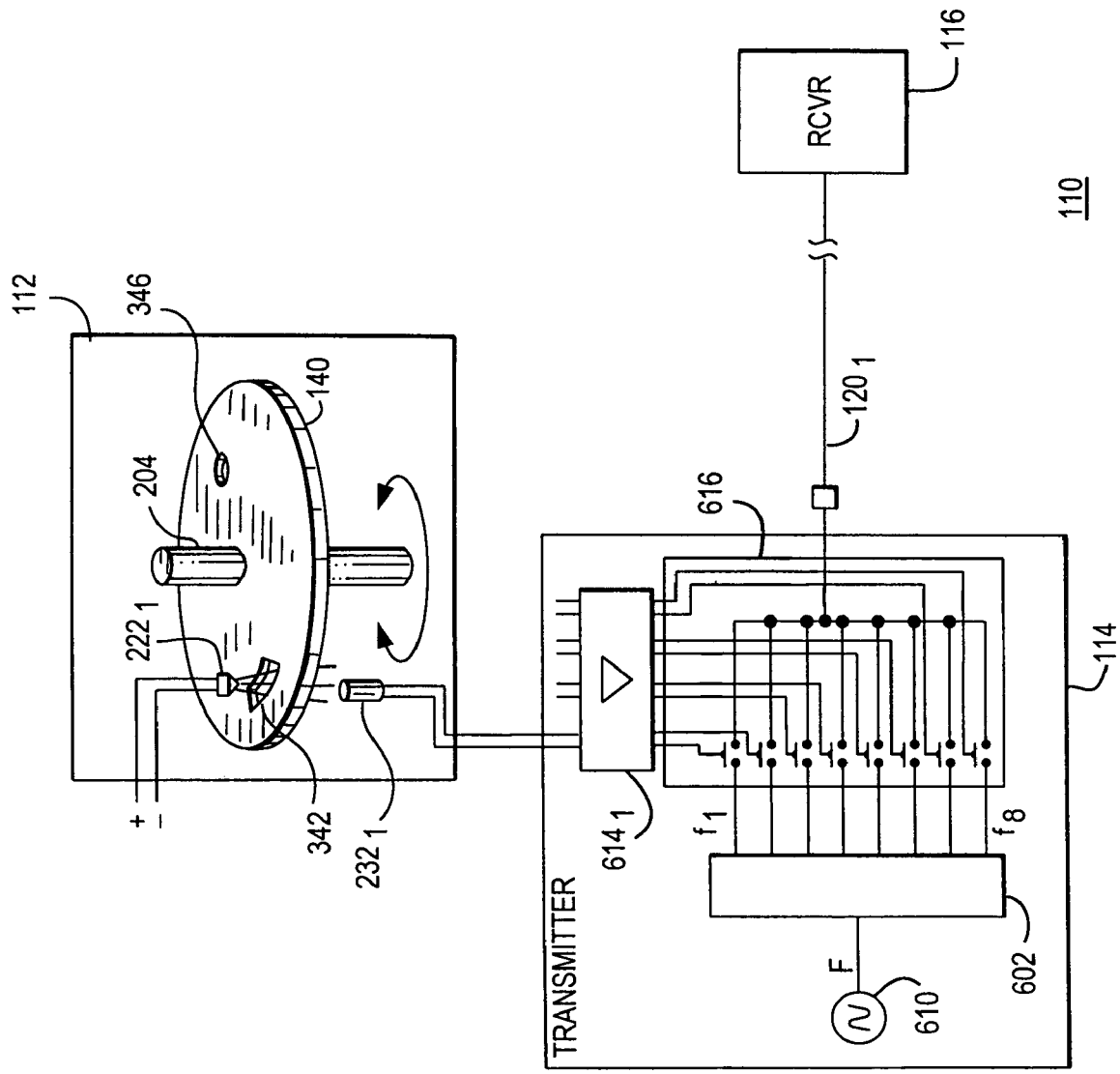
FIG. 6 is a schematic diagram of a second embodiment of the gas and wind sensor, a transmitter and at least one receiver of the present invention.

Referring to FIG. 6, in an alternative embodiment, a single signal generator 610 can be used having associated with it a frequency divider 602 to produce a plurality of output signals, where each output signal has a different frequency associated with each wind direction. For example, a signal generator producing a 5 volt signal at a frequency of 128 KHz can be divided into eight independent five volt signals $F_1$ to $F_8$, for example, having frequencies of 128 KHz, 64 KHz, 32 KHz, 16 KHz, 8 KHz, 4 KHz, 2 KHz, and 1 KHz, respectively.

The transmitter 114 includes a single amplifier 614 to amplify the output signal from the photocell 232 of the sensor 112. Additionally a single switch 616 can be used to select the proper signal with a particular frequency from the divider 602 for transmission to the receiver 116. That is, instead of providing eight independent switching circuits 412, the single switch 616 includes eight contacts associated with the eight output lines of the divider 602. The switch 616 selects the appropriate signal for transmission in response to receiving an output signal from a particular photocell 232 corresponding to the wind direction associated with the particular signal frequency. For example, if the wind direction is south, then the corresponding photocell associated with south produces an output that is amplified by the amplifier 614 and sent to the switch 616.

If, for example, 8 KHz, is the frequency associated with detecting wind from the southern direction, then the switch 616 selects (i.e., closes) the contact associated with transmitting a 5 Volt 8 KHz signal to the receiver 116. One skilled in the art will appreciate that each LED/photocell pair is associated with a particular frequency corresponding to a wind direction. Although not shown in FIG. 6, each LED/photocell pair has an output coupled to the switch 616 that causes the switch 616 to select the appropriate output signal from the frequency divider 602. If the wind direction changes to southwest, the photocell 232 associated with southwest sends an output signal to the switch 616, which causes it to select another output signal from the divider 602. In one embodiment, the switch 626 has eight inputs from the corresponding eight photocells 232 that serve as triggers to cause the switch to select the appropriate frequency signal from the divider 602. Thus, the frequency of the output signal from the transmitter is based on a particular one of the eight photocells sending an output signal to the switch, which selects the appropriate frequency.

Although the present invention of transmitting an output signal at a particular signal associated with a corresponding wind direction is discussed in terms of analog circuitry, one skilled in the art will appreciate that digital circuitry or a combination thereof can also be implemented in a similar manner to provide a plurality of signals having distinctive frequencies which are associated with a particular wind direction and/or detection of hazardous gases for transmission to one or more receivers. In another embodiment, a single coaxial cable 120 can be implemented for both the wind detection circuitry and the gas detection circuitry. Multiple signals of differing frequencies can be transmitted over a single coaxial cable by utilizing frequency division multiple accessed (FDMA) techniques and/or other conventionally known techniques in the art.

While the disclosed structure and apparatus have been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

I claim:

1. A personnel signaling and warning apparatus for identifying hazardous gases and indicating wind direction, comprising:
   a sensor housing;
   at least one gas sensor coupled to the sensor housing for detecting one or more hazardous gases, and adapted to transmit an output alarm signal associated with the detection of a hazardous gas at a distinctive predetermined frequency when a detected gas exceeds a predetermined threshold;
   a rotatable shaft, positioned along a central longitudinal axis through the housing, and adapted for receiving a vertical mast having a means for indicating wind direction;
   at least one light source disposed within said sensor housing;
   a plurality of photocells each of which is positioned proximate the at least one light source, each photocell representing a topographical direction and adapted to provide an output signal associated with a particular wind direction at a predetermined frequency; and
   a rotatable disk coupled to the shaft and positioned between the at least one light source and plurality of photocells, the rotatable disk having a slot sized to allow light to pass from the at least one light source to a particular photocell, wherein the slot is aligned between the at least one light source and the particular photocell based on wind direction, and the slot permits communication of an output signal associated with wind direction from said particular photocell at its predetermined frequency.

2. The apparatus of claim 1 further comprising a transmitter coupled to said sensor housing and adapted for transmitting said distinctive predetermined output signals associated with the hazardous gas and wind direction indicator signals.

3. The apparatus of claim 2 further comprising at least one receiver associated with said transmitter and adapted to receive said distinctive predetermined output signals associated with the detection of a hazardous gas and wind direction.

4. The apparatus of claim 3, wherein said at least one receiver is coupled to said transmitter via at least one of a coaxial cable, a radio refrequency transmitter and an infrared transmitter.

5. The apparatus of claim 4, wherein said at least one receiver comprises a plurality of serially coupled receivers.

6. The apparatus of claim 2, wherein said transmitter comprises:
   a plurality of switches, one of said switches being associated with, and electronically responsive to an output of said gas sensor, and each of the remaining switches being associated with, and electronically responsive to an output of one of said plurality of photocells; and
   a plurality of signal generators, each signal generator associated with and coupled to one of said plurality of switches to provide said output signal associated with a particular wind direction at a distinctive predetermined frequency and/or an output signal indicating detection of a hazardous gas, wherein a corresponding switch is triggered in response to receiving an output signal from a corresponding photocell and/or the gas sensor.

7. The apparatus of claim 6, wherein each signal generator produces a continuous sine wave.

8. The apparatus of claim 6, wherein said receiver comprises:
   a plurality of bandpass filters, each of which having a center frequency associated with a corresponding one of said plurality of signal generators; and a plurality of signal indicators, each of which is coupled to a corresponding bandpass filter, one of said signal indicators providing indicia of a hazardous gas condition, and the remaining indicators providing indicia of a signal associated with wind direction being received from said transmitter.

9. The apparatus of claim 8, wherein said signal indicators associated with wind direction includes an LED and said signal indicator associated with a hazardous gas condition includes at least one of a visible alarm indicator and an audible alarm.

10. The apparatus of claim 2, wherein said transmitter comprises:
a first switch being associated with, and electronically responsive to an output of one of said plurality of photocells;
a signal generator for generating an output signal having a first predetermined frequency; and
a frequency divider coupled to the output of said signal generator, said frequency divider producing a plurality of output signals, each output signal having a unique frequency that represents one of said topographical directions, said plurality of output signals being coupled to a corresponding input of said first switch, wherein the first switch selects one of said plurality of output signals for transmission in response to receiving an output signal from a corresponding photocell.

11. The apparatus of claim 2, wherein said transmitter further comprises:
a second switch being associated with, and electronically responsive to an output of said gas sensor; said second switch coupled to an output of said frequency divider for receiving an output signal having a predetermined frequency and associated with detection of a hazardous gas, said second switch selecting said output signal having a predetermined frequency from said divider for transmission in response to receiving an output signal from the gas sensor.

12. The apparatus of claim 1, wherein said plurality of photocells comprises eight photocells circumscribing said rotatable shaft, said photocells being evenly spaced at 45° intervals and equidistant from the center of rotation of the shaft.

13. The apparatus of claim 12, wherein said at least one light source includes eight LEDs circumscribing said rotatable shaft, said LEDs being spaced at 45° intervals equidistant from the center of rotation of said shaft.

14. The apparatus of claim 13, wherein said eight LEDs and eight photocells are aligned, whereby each LED is associated with a particular photocell.

15. The apparatus of claim 12, wherein the eight photocells represent topographical directions of N, NE, E, SE, S, SW, W and NW.

16. The apparatus of claim 1, wherein said at least one light source is selected from the group consisting of light emitting diodes (LED), optical cables, gel cables, fluorescent bulbs, incandescent bulbs, halogen bulbs and xenon lamps.

17. The apparatus of claim 1, wherein said disk is fixedly mounted perpendicular to said rotatable shaft and rotates between said at least one light source and said plurality of photocells; and said slot is sized to permit a single photocell to receive light from said at least one light source at any given time.

18. The apparatus of claim 1, wherein said means for indicating wind direction is selected from the group consisting of a weather vane, a windsock and a wind ribbon.

19. The apparatus of claim 18, further comprising a means for locking said indicating means in a particular direction.

20. The apparatus of claim 19, wherein said means for locking said indicating means in a particular direction comprises:
a second light source disposed within said sensor housing;
a selected photocell of the plurality of photocells aligned with said second light source and aligned with a topographical direction; and
an orifice formed in said disk and radially positioned to align between said second light source and said selected photocell of the plurality of photocells upon rotation of the disk; and
a directional indicator coupled to an output of said selected photocell, said directional indicator providing an indication of proper disk alignment with said topographical direction when said orifice is aligned between said second light source and said selected photocell of the plurality of photocells.

21. The apparatus of claim 1, wherein said means for indicating wind direction is coupled to the second end of said rotatable shaft via a mast.

22. The apparatus of claim 1, wherein each predetermined frequency differs from other output signal frequencies associated with different wind directions.

23. An early-warning system for alerting personnel located in a prescribed area or facility of the presence of a hazardous gas, the system comprising:
a. at least one signal receiver and alarm located in the prescribed area or facility that includes a wind direction indicator display and at least one of a hazardous gas indicator visible and audible alarm;
b. a plurality of independent apparatus for detecting a hazardous gas and indicating wind direction according to claim 1, said apparatus placed in predetermined spaced apart locations proximate the prescribed area or facility and intermediate the potential source of the hazardous gas and the prescribed area or facility to form an array;
c. a transmitter operably connected to each of the plurality of hazardous gas detection and wind direction indicating apparatus for transmitting distinctive output signals corresponding to the detection of a hazardous gas and a wind direction to the at least one receiver located in the prescribed area or facility, whereby the locations of the apparatus forming the array are selected based upon the local prevailing winds and the relative location of the potential source or sources of hazardous gas in order to provide adequate time for personnel to select an evacuation route and to complete their evacuation of the prescribed area or facility.

* * * * *